Patented May 22, 1951

2,553,767

UNITED STATES PATENT OFFICE 2,553,767

METHOD OF SEPARATING CHLORINE AND SULFUR DIOXIDE FROM MIXTURES THEREOF

Arthur W. Hixson, Leonia, N. J., and Ralph Miller, New York, N. Y., assignors to The Chemical Foundation, Incorporated, a membership corporation of New York No Drawing. Application October 1, 1946, Serial No. 700,378

11 Claims. (Cl. 23—178)

This invention relates to a method of separating chlorine and sulphur dioxide from mixtures thereof.

This application is a continuation in part of application, Serial No. 400,662, filed July 1, 1941, now forfeited.

It has been found, as is more particularly explained in copending application, Serial No. 263,190, filed March 21, 1939, now Patent No. 2,441,550, that it is possible to produce sodium sulphate and chlorine from sodium chloride by effective methods. In one general method liquid sulphur trioxide was contacted with sodium chloride to form sodium chlorosulfonate which was thermally decomposed to form sodium sulphate, chlorine and sulphur dioxide; the sulphur dioxide and chlorine were separated, the separated sulphur dioxide oxidized to the trioxide and employed for reacting with further amounts of sodium chloride.

In another method chlorosulfonic acid was reacted with sodium chloride to form sodium chlorosulfonate and gaseous hydrogen chloride. The chlorosulfonate was thermally decomposed to form sodium sulphate, sulphur dioxide and chlorine; the sulphur dioxide and chlorine were separated, the separated sulphur dioxide was oxidized and reacted with the hydrogen chloride to form the chlorosulfonic acid which was employed for further reaction with salt.

In addition to the above outlined two step methods the invention described in the earlier application comprehended a direct conversion. In this operation sulphur trioxide was directly reacted with sodium chloride under such elevated temperature conditions as to directly form sodium sulphate and a mixture of sulphur dioxide and chlorine in substantially equimolecular proportions. The sulphur dioxide was separated from the chlorine as by preferential liquefaction, oxidized to the trioxide and, absorbed by oleum. The oleum was then heated to evolve sulphur trioxide and this, undiluted with oxygen, was used to react with the salt.

A major important step in each of these methods is the separation of the gaseous reaction products, sulphur dioxide and chlorine. The methods of separation described in the earlier application while efficient required either low temperature or high pressure, for liquefaction, which necessitated careful control and relatively expensive equipment.

It has now been found that the described separation may be very simply and economically effectuated. Under the new method the separation may be effected under wide permissible variations of temperature and pressure thus permitting its adaptation to optimum chosen conditions. As will be seen the new method also insures a rapid and complete separation and without the consumption of chemical reagents.

The invention broadly comprehends the concept of selectively reacting sulphur dioxide with a material with which it forms an addition compound and from which it may be evolved or liberated by elevation of temperature and which is inert towards chlorine.

As is known, chlorine is more volatile than sulphur dioxide. The present invention advantageously utilizes this difference in volatility. The preferred selective reactant for the new method is anhydrous aluminum chloride. This reacts with sulphur dioxide to form an addition compound which may be solid or liquid depending upon the temperature. Under ordinary conditions the addition compound is a viscous liquid at 80° C. When the temperature is reduced the solution becomes more and more viscous and conversely when the temperature is raised it becomes more fluid.

A favorable feature of the compound is that the vapor pressure of sulphur dioxide above it is small at ordinary temperatures, such vapor pressure being about equivalent to atmospheric pressure at about 140° C. Another important characteristic of aluminum chloride is that it does not react with chlorine so that the action with sulphur dioxide is truly selective.

The present invention is based on these selective features. When aluminum chloride is contacted with a gaseous mixture containing chlorine and sulphur dioxide at a temperature of somewhat below 140° C. the chloride reacts selectively wtih sulphur dioxide to form the addition compound. In practical effect this decreases the vapor pressure of the sulphur dioxide without affecting the vapor pressure of the chlorine. It will be obvious that if elevated pressures are desired to be employed the temperature range may be extended.

It will be appreciated that with the described specificity of action of the aluminum chloride the process may be carried out in a variety of methods. In one illustrative operation the absorbent material may be utilized in two or more towers through which the gases to be treated may alternately be passed. The gaseous mixture to be separated may be passed through one tower packed with aluminum chloride. This tower preferably is provided with suitable heating and cooling means. The gas is allowed to flow through at such a rate that all the sulphur dioxide in the entering mixture reacts with the chloride. The chlorine, free from sulphur dioxide, which is withdrawn from the tower is passed to a receiver.

When the aluminum chloride in the one tower has become exhausted by complete reaction, the flow of entering gas is then diverted to a second tower of the battery. Pure sulphur dioxide may then be passed through the first tower to sweep out any residual chlorine and this gas mixture may be passed through the second tower for fractionation therein.

After the first tower has been cleared of chlorine the flow of sulphur dioxide therethrough is stopped and the addition compound is treated in situ to regenerate aluminum chloride. This may be done by heating the mass to a temperature above about 140° C. to drive off the sulphur dioxide. By suitable connections this evolved sulphur dioxide may be led to a gas holder and may subsequently be oxidized to sulphur trioxide which may be reacted with sodium chloride by any of the several methods described in the earlier application. After heat treatment of the addition compound and evolution of its combined sulphur dioxide, the first tower may be put back in the circuit. By thus alternating the entering gas stream between two or more towers a continuous operation may be carried out.

If desired, the spent aluminum chloride may be removed from the tower and passed to a separate unit for regeneration therein. In this event it is desirable to first heat up the addition compound to increase its fluidity so as to permit gravity or pressure flow from the tower. It will also be appreciated that the aluminum chloride may be extenuated to any desired degree by employing it on inert carriers.

It is to be observed that in the regeneration step when the addition compound is heated to the neighborhood of 140° C., under atmospheric pressure, only about one-half of the sulphur dioxide present is evolved. Thus, after the initial contacting of the aluminum chloride with sulphur dioxide the material which is returned to the absorption portion of the cycle will have the approximate composition $(AlCl_3)_2SO_2$. Upon contact with sulphur dioxide containing gas at a lower temperature a reaction takes place which may be indicated as follows: $(AlCl_3)_2SO_2 + SO_2 = 2AlCl_3SO_2$. Hence, where aluminum chloride is described herein as the absorbent it is to be understood that such absorbent may vary in composition between $(AlCl_3)_2SO_2$ and $AlCl_3SO_2$.

The process with equal facility may be carried out using aluminum chloride in liquid phase. For this operation the reaction between sulphur dioxide and the chloride is carried out at the appropriately low temperature and/or elevated pressure. It is preferable, other things being equal, to carry out the operation at elevated pressure for with such elevated pressure a higher temperature with consequent improved fluidity of the addition compound is insured. Operating at higher pressures also permits the ready separation of chlorine by releasing the pressure and removing it from the less volatile addition compound.

As will be appreciated, the novel principles of the invention may be embodied in a number of specifically different methods utilizing a wide variety of apparatus. The process described is merely illustrative of a typical physical embodiment of the fundamental principles which constitutes the invention.

We claim:

1. A method of separating sulphur dioxide and chlorine from a gaseous mixture of these components which comprises, contacting the mixture with solid aluminum chloride under conditions regulated to effect the formation of an addition compound of the chloride and sulphur dioxide and recovering chlorine substantially free from sulphur dioxide.

2. A method of separating sulphur dioxide and chlorine from a mixture thereof which comprises, contacting the mixture with anhydrous aluminum chloride under conditions which insure the formation of a solid addition compound of the chloride and sulphur dioxide, separating chlorine and the addition compound and heating the addition compound to evolve the combined sulphur dioxide.

3. A method of separating sulphur dioxide and chlorine from a gaseous mixture thereof which comprises, continuously contacting anhydrous aluminum chloride with a flowing stream of the gaseous mixture to preferentially abstract the sulphur dioxide from the mixture to insure the formation of a non-gaseous addition compound of sulphur dioxide and the chloride and continuously removing chlorine substantially free from sulphur dioxide.

4. A method of separating sulphur dioxide and chlorine from a gaseous mixture thereof which comprises, continuously contacting anhydrous aluminum chloride with a flowing stream of the gaseous mixture at a temperature below 140° C. to preferentially abstract the sulphur dioxide from the mixture by insuring the formation of an addition compound of sulphur dioxide and the chloride and continuously removing chlorine substantially free from sulphur dioxide.

5. A method of separating sulphur dioxide and chlorine from a gaseous mixture thereof which comprises continuously contacting solid aluminum chloride with a flowing stream of the gaseous mixture to thereby directly form a non-gaseous addition compound of sulphur dioxide and the chloride, continuously removing chlorine substantially free from sulphur dioxide, thermally decomposing the addition compound to form sulphur dioxide and aluminum chloride and re-employing the regenerated aluminum chloride in the process.

6. A method of separating sulphur dioxide and chlorine from a liquid mixture thereof which comprises, contacting the mixture with anhydrous aluminum chloride under conditions regulated to effect the formation of an addition compound of the chloride and sulphur dioxide and separating chlorine from the said compound.

7. In the method of producing sodium sulphate and chlorine from sodium chloride that improvement which comprises, reacting sulphur trioxide with sodium chloride under conditions regulated to form sodium sulphate and a mixture of chlorine and sulphur dioxide in substantially equimolecular proportions, removing the gaseous mixture from the solid products of the reaction, contacting the gaseous mixture with aluminum chloride which preferentially reacts with the sulphur dioxide to effect the formation of a non-gaseous addition compound, separating the chlorine from the said compound, thermally decomposing the compound to form sulphur dioxide and regenerated aluminum chloride, mixing the recovered sulphur dioxide with air and under conditions regulated to oxidize the sulphur dioxide to sulphur trioxide, absorbing the sulphur trioxide thus formed in sulphuric acid to produce oleum, heating the resulting oleum to recover undiluted sulphur trioxide and reacting the produced sulphur trioxide with additional sodium chloride in the first reaction stage for the continued production of sodium sulphate and chlorine.

8. The process of producing chlorine and sodium sulphate comprising, burning sulphur-containing material to form sulphur dioxide; oxidizing the sulphur dioxide to sulphur trioxide; cooling the sulphur trioxide and absorbing it in oleum; heating the oleum to evolve sulphur trioxide; contacting sulphur trioxide with sodium chloride to form sodium chlorosulfonate; thermally decomposing the sodium chlorosulfonate to form gaseous chlorine, sulphur dioxide and solid sodium sulphate, separating the solid sodium sulphate from the gaseous mixture, contacting the gaseous mixture wtih anhydrous aluminum chloride under conditions regulated to form an addition compound of sulphur dioxide and the chloride; separating gaseous chlorine from the solid addition compound; thermally decomposing the solid addition compound to form sulphur dioxide and regenerated aluminum chloride; oxidizing the recovered sulphur dioxide to sulphur trioxide for recycling in the process and reemploying the regenerated aluminum chloride for separation of sulphur dioxide from its mixture with chlorine.

9. A process of removing sulphur dioxide from a gaseous mixture of sulphur dioxide and chlorine which comprises, contacting said gaseous mixture with a non-gaseous reagent derived from aluminum chloride and sulphur dioxide, the contacting taking place at a temperature substantially below 140° C., whereby a non-gaseous addition compound of aluminum chloride and sulphur dioxide is formed, separating the gaseous chlorine from said non-gaseous addition compound, heating said non-gaseous addition compound to a temperature not substantially lower than 140° C., whereby a substantial part of the sulphur dioxide is driven off as a gas, separating said gaseous sulphur dioxide from the non-gaseous residue and cooling said separated non-gaseous residue to the contacting temperature whereby said separated non-gaseous residue is made ready for reuse in the process.

10. The method of separating sulphur dioxide and chlorine from a liquid mixture thereof which comprises, contacting the mixture with an anhydrous reagent derived from aluminum chloride and sulfur dioxide, the contacting taking place under conditions regulated to effect the formation of an addition compound of aluminum chloride and sulphur dioxide and separating chlorine from the said compound.

11. A method of removing sulfur dioxide from a gaseous mixture of sulfur dioxide and chlorine which comprises, contacting said gaseous mixture with a non-gaseous reagent, the contacting taking place under conditions regulated to effect the formation of a non-gaseous addition compound of aluminum chloride and sulfur dioxide and separating the gaseous chlorine from the said non-gaseous addition compound; said non-gaseous reagent being prepared by heating a non-gaseous addition compound of aluminum chloride and sulfur dioxide to a temperature at which a substantial portion of the sulfur dioxide is driven off as a gas and separating the gaseous sulfur dioxide from the non-gaseous residue, said non-gaseous residue being the aforesaid non-gaseous reagent.

ARTHUR W. HIXSON.
RALPH MILLER.

REFERENCES CITED

The following references are of record in the file of this patent:

UNITED STATES PATENTS

| Number | Name | Date |
|---|---|---|
| 2,375,011 | McAdam | May 1, 1945 |
| 2,377,138 | Farrell et al. | May 29, 1945 |

OTHER REFERENCES

Thomas "Anhydrous Aluminum Chloride"; Reinhold Publishing Co., N. Y. (1941).